US012561178B2

(12) United States Patent
Chandrasekaran et al.

(10) Patent No.: US 12,561,178 B2
(45) Date of Patent: Feb. 24, 2026

(54) SYSTEM AND METHOD FOR MANAGING DATA RETENTION IN DISTRIBUTED SYSTEMS

(71) Applicant: Dell Products L.P., Round Rock, TX (US)

(72) Inventors: Balasubramanian Chandrasekaran, Austin, TX (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 496 days.

(21) Appl. No.: 18/160,489

(22) Filed: Jan. 27, 2023

(65) Prior Publication Data

US 2024/0256352 A1     Aug. 1, 2024

(51) Int. Cl.
| | |
|---|---|
| *G06F 9/46* | (2006.01) |
| *G06F 9/48* | (2006.01) |
| *G06F 9/50* | (2006.01) |

(52) U.S. Cl.
CPC ............ *G06F 9/505* (2013.01); *G06F 9/4875* (2013.01)

(58) Field of Classification Search
CPC ............................... G06F 9/505; G06F 9/4875
See application file for complete search history.

(56) References Cited

U.S. PATENT DOCUMENTS

| | | |
|---|---|---|
| 10,013,273 B1 | 7/2018 | Gupta |
| 2011/0099403 A1 | 4/2011 | Miyata |
| 2016/0378563 A1 | 12/2016 | Gaurav |
| 2017/0371693 A1 | 12/2017 | Corrie |
| 2018/0260125 A1 * | 9/2018 | Botes ................. G06F 11/2048 |
| 2018/0276020 A1 | 9/2018 | Kimura |
| 2019/0068442 A1 | 2/2019 | Kondo |
| 2019/0179661 A1 * | 6/2019 | Dhoolam ............. G06F 3/0605 |
| 2021/0232419 A1 | 7/2021 | Mueller |
| 2022/0318050 A1 * | 10/2022 | Gokam ................ G06F 9/4875 |
| 2023/0109690 A1 * | 4/2023 | Mutha .................. G06F 9/5083 |
| | | 718/1 |
| 2023/0244392 A1 | 8/2023 | Jain |

OTHER PUBLICATIONS

"A Guide to Deploying Machine Learning Models on Kubernetes," Seldon Technologies, Jan. 2, 2022 (8 Pages).
"Vertical Pod autoscaling," Google Cloud, Web Page https://cloud.google.com/kubernetes-engine/docs/concepts/verticalpodautoscaler accessed on Sep. 11, 2022 (10 Pages).

(Continued)

*Primary Examiner* — Diem K Cao

(74) *Attorney, Agent, or Firm* — WOMBLE BOND DICKINSON (US) LLP

(57)     ABSTRACT

Methods and systems for managing data of pods are disclosed. To manage the data of pods, volumes in which the data used by the pods is stored may be migrated over time based on the likelihood of the data being used in the future. During decommissioning of pods, data from the volumes may be automatically migrated to different locations. Additionally, different data protection schemes for the data may be implemented once stored at the different locations. The data protection schemes may include, for example, replication and erasure coding.

20 Claims, 6 Drawing Sheets

(56)  References Cited

OTHER PUBLICATIONS

"Scaling Triton Inference Server," Nvidia, 2022, Web Page <https://docs.nvidia.com/ai-enterprise/natural-language/0.1.0/scaling.html> (17 Pages).

Sharma, Girish, "How to Autoscale Kubernetes PodsBased on GPU," Private AI, May 31, 2022, Web Page <https://www.private-ai.com/2022/05/31/how-to-autoscale-kubernetes-pods-based-on-gpu/> (16 Pages).

Rattihalli, Gourav et al. "Exploring potential for non-disruptive vertical auto scaling and resource estimation in kubernetes." 2019 IEEE 12th International Conference on Cloud Computing (Cloud). IEEE, 2019. (8 Pages).

* cited by examiner

SYSTEM AND METHOD FOR MANAGING DATA RETENTION IN DISTRIBUTED SYSTEMS

FIELD

Embodiments disclosed herein relate generally to operation management. More particularly, embodiments disclosed herein relate to systems and methods to manage data used by pods over time.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
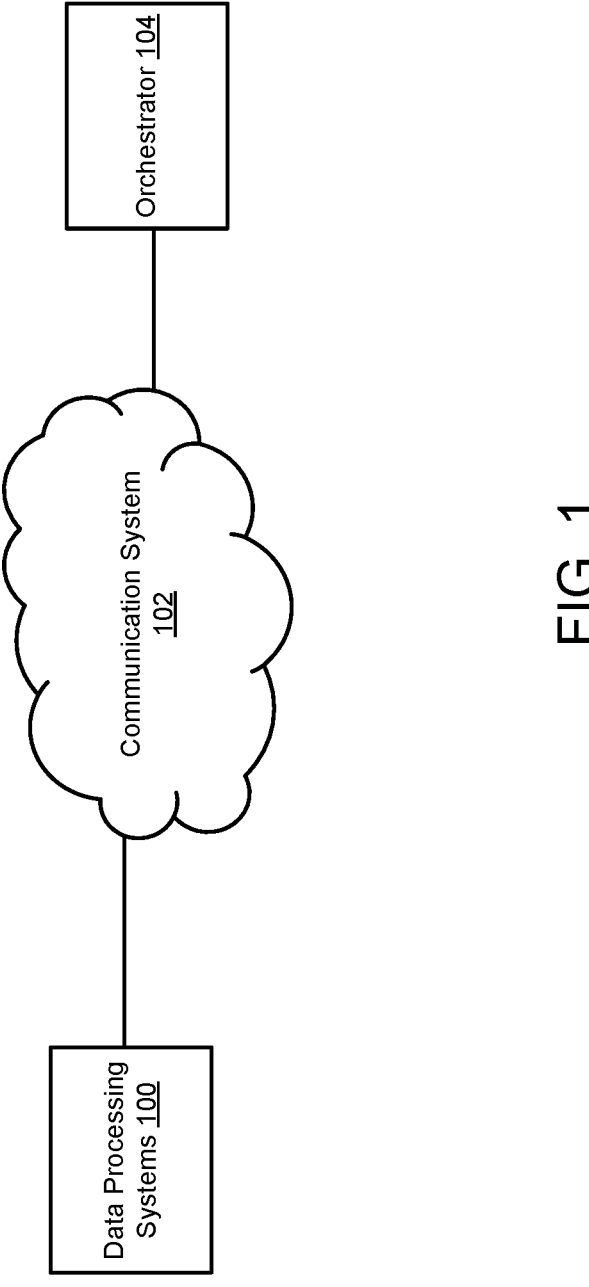
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services using pods. To provide the computer implemented services, instances of the pods may be dynamically instantiated and decommissioned over time.

The pods may be hosted by any number of data processing systems. Over time, the numbers and types of pods may be changed through instantiation and decommissioning. When a pod is instantiated, a quantity of storage resources may be allocated for use by the pod. To improve the performance of the pod, the selected storage resources may be higher performance resources. During operation, the pod may generate and store various types of data in the storage resources.

When a pod is decommissioned, the data that the pod previously stored in the storage resources may be used by future instances of the pod. For example, when a new instance of a pod begins to operate, it may do so using the data (or copies of the data) in the storage resources to provide continuity of operation (e.g., the newly operating pod may act like the previously decommissioned instance of the pod).

However, because there may be large amounts of time between when the pod is decommissioned and a new instance of the pod is instantiated, the data in the storage resources of the decommissioned pod may be moved to retention drives for storage. In contrast to the drives used to provide the storage resources during operation of the pod, the retention drives may be of lower performance. However, by doing so, storage space of the higher performance drives may be released for use by active pods or other active entities.

By doing so, a system in accordance with embodiments disclosed herein may provide for dynamic deployment and decommissioning of pods that are more likely to be of higher performance. For example, the deployed pod instances may be more likely to have sufficient rates of data access such that the operation of the pods instances are not limited due to data access by use of higher performance storage drives. In contrast, while not operating and following decommission, data used by the pods may be stored in lower performance storage drives at least temporarily to free limited storage resources of the high performance storage drives for other uses. Accordingly, embodiments disclosed here may address, among other problems, the technical problem of data access limitations. By automatically migrating data used by decommissioned pods, access limits due to the underlying storage media may be less likely to limit the operation of the pods. Accordingly, a data processing system in accordance with embodiments disclosed herein may more efficiently marshal limited computing resources by storing it in storage devices with performance characteristics selected to meet expected rates of access of the data stored therein.

In an embodiment, a method for providing computer implemented services using pods of containers is provided. The method may include obtaining, by an orchestrator tasked with managing the pods, a data access pattern for a volume used by an instance of a pod of the pods that provide the computer implemented services; performing, based on the data access pattern, a reclamation policy analysis for the pod; in an instance of the reclamation policy analysis where the pod is selected for reclamation: performing a migration analysis for the volume to identify a storage location and a data protection scheme for the volume; establishing a retention volume based on the data protection scheme; populating the retention volume with data from the volume; discarding the volume; and providing the computer implemented services using a portion of the pods that remain in operation.

The volume may be stored, at least in part, in a cache drive and the storage location comprises a retention drive.

The volume may be protected using a replication scheme while stored in the cache drive.

The data protection scheme may be an erasure coding scheme, and the retention drive may be a lower performance drive compared to the cache drive.

Performing the reclamation policy analysis may include identifying a policy comprising criteria for decommissioning of the pod; monitoring characteristics of the pod; comparing the characteristics of the pod to the criteria; and selecting the pod for decommissioning in an instance of the comparing where the characteristics of the pod meet the criteria.

The criteria may specify a level of use of the pod.

Performing the migration analysis may include identifying a likelihood of a new instance of the pod being instantiated; identifying a level of storage resource use for the volume under different data protection schemes; and selecting, based on the likelihood and the level of storage resource use, the storage location and the data protection scheme.

In an embodiment, a non-transitory media is provided. The non-transitory media may include instructions that when executed by a processor cause the computer implemented method to be performed.

In an embodiment, a data processing system is provided. The data processing system may include the non-transitory media and a processor, and may perform the computer implemented method when the computer instructions are executed by the processor.

Turning to FIG. 1, a block diagram illustrating a system in accordance with an embodiment is shown. The system shown in FIG. 1 may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include any number of data processing systems 100. Data processing systems 100 may provide the computer implemented services to users of data processing systems 100 and/or to other devices (not shown). Different data processing systems may provide similar and/or different computer implemented services.

To provide the computer implemented services, data processing systems 100 may include various hardware components (e.g., processors, memory modules, storage devices, etc.) and host various software components (e.g., operating systems, application, startup managers such as basic input-output systems, etc.). These hardware and software components may provide the computer implemented services via their operation.

The software components may be implemented using containers, and pods of containers that may share a same context (e.g., have access to shared hardware resources such as shared storage, shared network resources, etc.). The containers may include any number of applications and support services (e.g., dependencies, such as code, runtime, system libraries, etc.) for the applications. The applications may independently and/or cooperatively provide the computer implemented services.

In general, embodiments disclosed herein may provide methods, systems, and/or devices for providing computer implemented services using pods of containers. To provide the computer implemented services, pods may be dynamically deployed and decommissioned over time as demand for use of the computer implemented services changes over time.

When deployed, a policy for the pod may be established. The policy may specify criteria for when the pod is to be decommissioned. The criteria may include, for example, levels of use of computer implemented services provided by the pod (e.g., either alone or in combination with other pods) and/or other criteria usable to manage the quantity of resources dedicated to providing the computer implemented services by the pod. When the criteria is met, the pod may be automatically decommissioned. Doing so may redistribute the use of the services across the remaining pods providing the type of computer implemented services provided by the decommissioned pod.

When operating, the applications hosted by the containers of the pods may generate new data and need to access previously stored data. To do so, various portions of storage resources of a data processing system may be dedicated for use by the pods. For example, a volume (e.g., an identifiable portion of storage resources, such as all of the storage space of a storage device, or a portion of the storage space, or some store space from multiple storage devices, etc.) may be allocated for user by a pod thereby allowing the applications to store and access stored data.

The storage in which the volumes are stored by a tiered. For example, the storage may include a range of different types of storage devices that provide different levels of storage performance, and at different cost points.

Figure 2A:
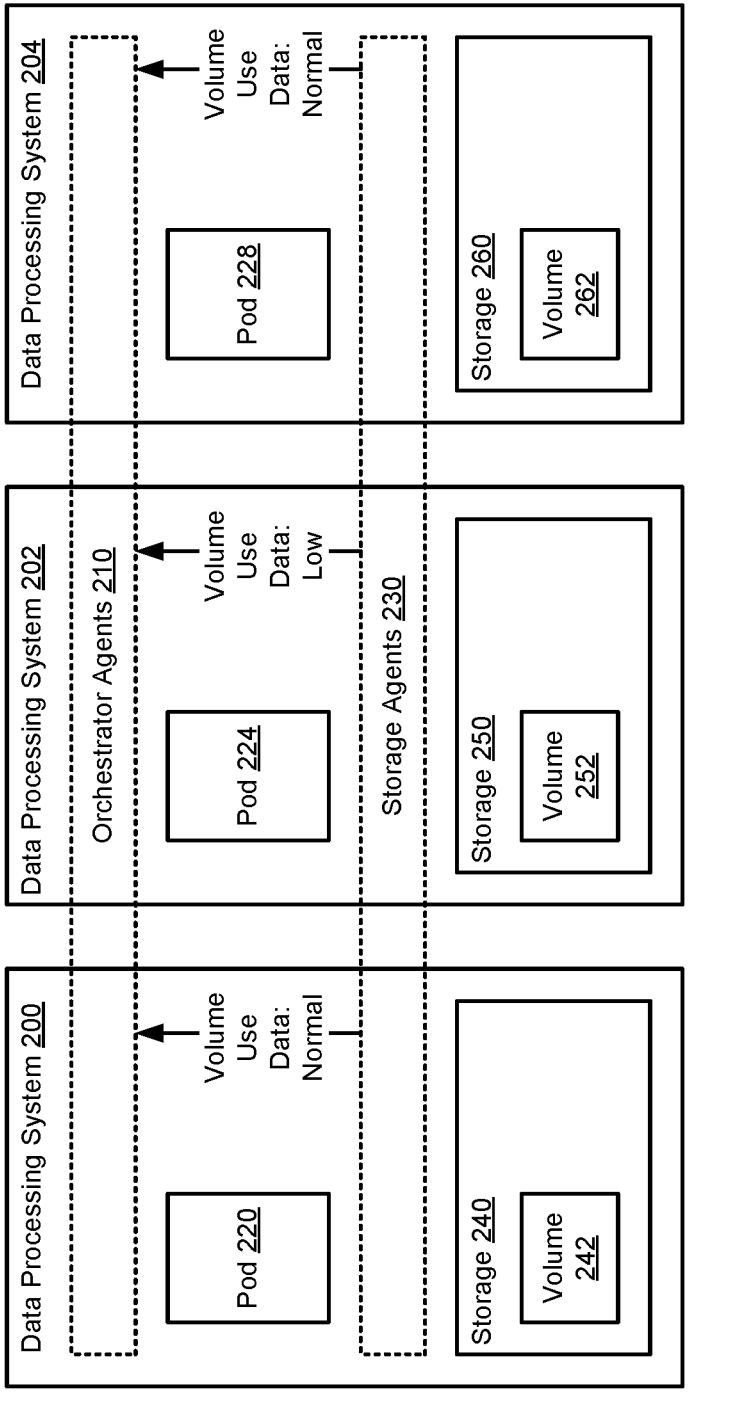
FIGS. 2A-2C show diagrams illustrating data flows, processes, and other aspects of a system in accordance with an embodiment.
Figure 2B:
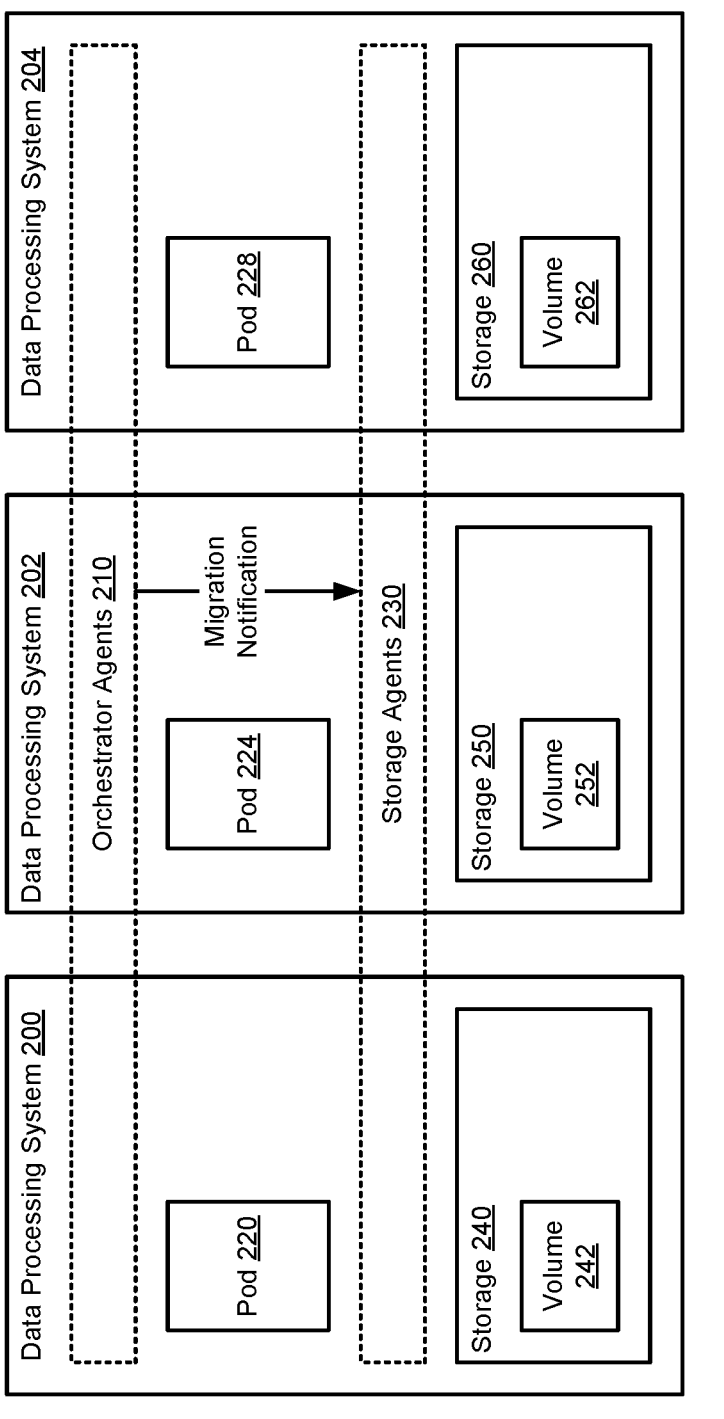
Figure 2C:
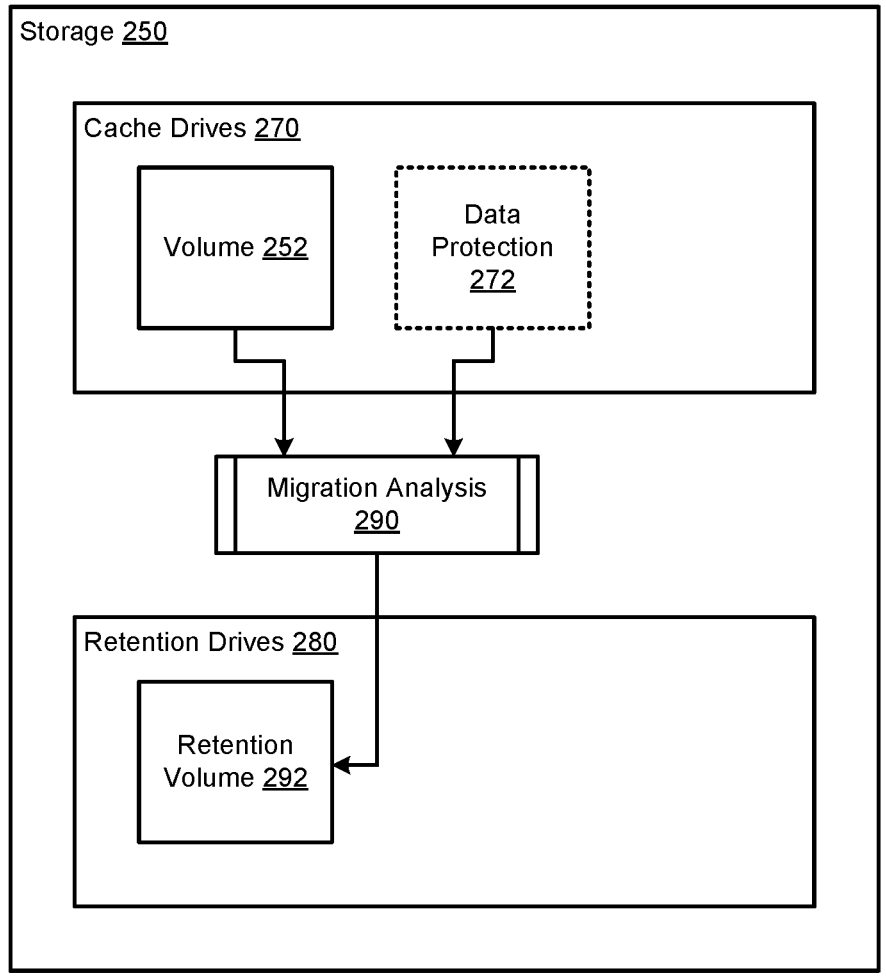

To improve the efficiency of use of limited storage resources of the storage, the system of FIG. 1 may include orchestrator 104. Orchestrator 104 may (i) instantiate and decommission instances of pods, (ii) during decommissioning of pods, migrate data from the volume used by the decommissioned pods to reduce tier level storage, and/or (iii) during the migrations, establish low resource consumption data protection schemes for the migrated data. By doing so, the system of FIG. 1 may reduce resource consumption for storing data used by pods over time. Refer to FIGS. 2A-2C for additional details regarding decommissioning of pods and data migration.

Figure 3:
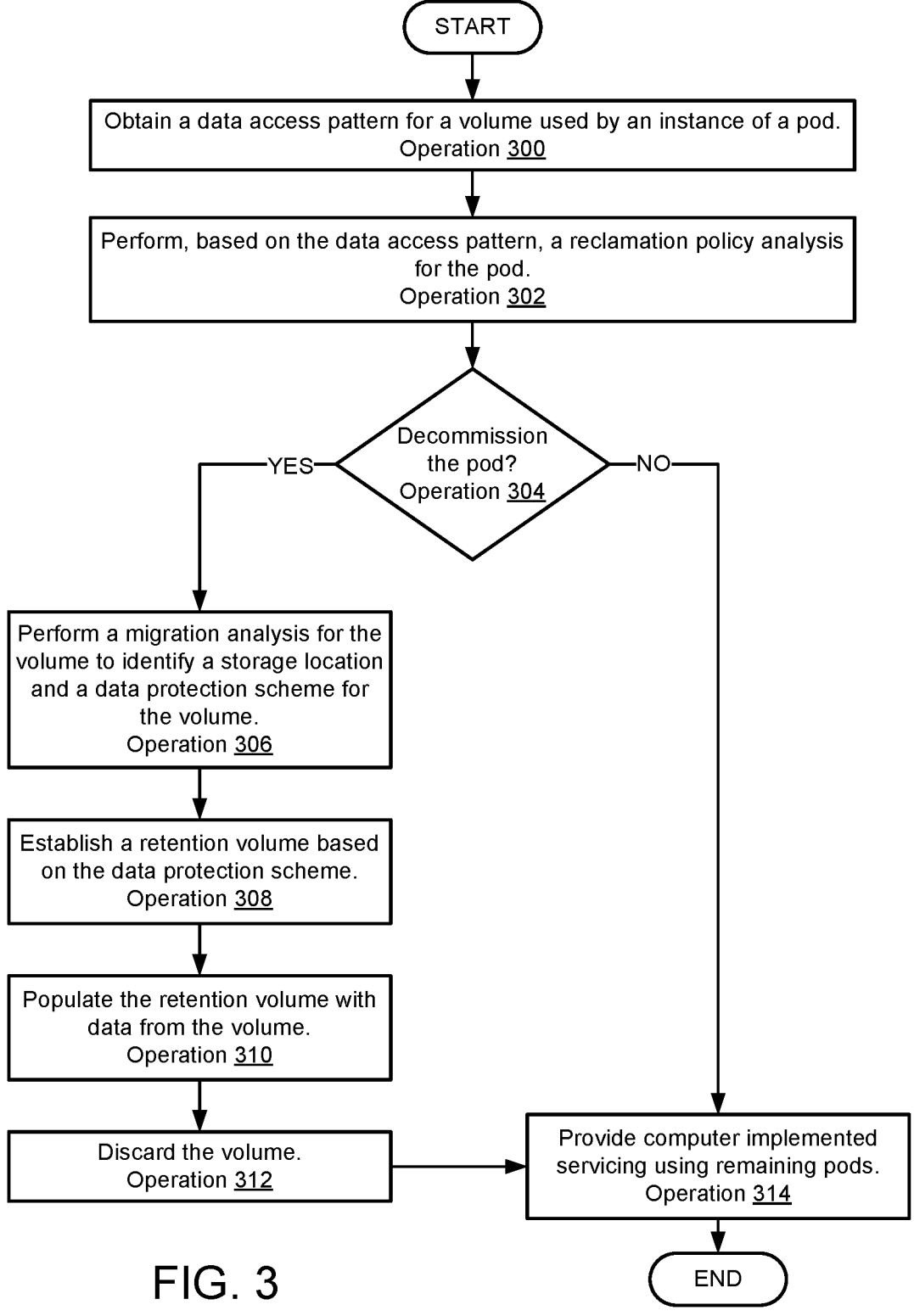
FIG. 3 shows a flow diagram illustrating a method of providing computer implemented services using pods in accordance with an embodiment.

When providing its functionality, data processing systems 100 and/or orchestrator 104 may perform all, or a portion, of the method illustrated in FIG. 3.

Any of data processing systems 100 and/or orchestrator 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

While illustrated in FIG. 1 as being separate from data processing systems 100, data processing systems 100 may perform the functionality of orchestrator 104 without departing from embodiments disclosed herein. For example, rather than being implemented with a separate device, the functionality of orchestrator 104 may be implemented with a distributed service hosted by all, or a portion, of data processing systems 100.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the Internet Protocol).

While illustrated in FIG. 1 as including a limited number of specific components, a system in accordance with an embodiment may include fewer, additional, and/or different components than those illustrated therein.

To further clarify embodiments disclosed herein, diagrams illustrating data flows implemented by and data structures used by a system over time in accordance with an embodiment are shown in FIGS. 2A-2C.

Turning to FIG. 2A, a first data flow diagram illustrating data flows, data processing, and/or other operations that may be performed by the system of FIG. 1 in accordance with an embodiment is shown. In FIG. 2A, data processing systems 200-204 may be similar to data processing systems 100. Each of data processing systems 200-204 may host orchestrator agents 210 and storage agents 230. The orchestrator agents may provide the functionality of orchestrator 104.

The storage agents 230 may implement a management plane for storage resources of the data processing systems. The management plane may include functionality to (i) monitor access patterns of pods, (ii) instantiating volumes, (iii) replicate volumes, (iv) remove volumes, (v) migrate volume, (vi) implement data protection schemes (e.g., erasure coding, duplication/replication, etc.) and/or perform other functions to manage the storage resources of the data processing systems. When migrating volumes, storage agents 230 may implement remote direct memory access (RDMA) to facilitate volume replication if the volumes are moved between storage of data processing systems. For example, RDMA may support zero-copy networking which may allow network adapters of the data processing systems to transfer data directly from network to memory, and the reverse. Consequently, the data may not need to be buffered in management buffers (e.g., operating system data buffers) thereby eliminating (or greatly reducing) use of processors, caches, and/or context switches for volume migration, replication, and/or other operations that extend across multiple data processing systems.

To provide various computer implemented services, data processing systems 200-204 may host various pods. The pods may have been instantiated by orchestrator 104. While illustrated in FIG. 2A as hosing a single pod, it will be appreciated that a data processing system may host any number of pods.

To manage the pods (e.g., 220, 224, 228) hosted by data processing systems 200-204, the orchestrator (e.g., through orchestrator agents 210) may monitor use of volumes by various pods over time. For example, when providing its functionality, pod 220 may utilize volume 242. Pod and pod 228 may similarly use volume 252 and volume 262, respectively, during their operation. Through monitoring of the use of these volumes, the orchestrator may identify the data access patterns of the pods. The orchestrator may store information regarding these access patterns, such as associations between the pods and volumes.

The information may be stored in any format. For example, the information may be stored in a database, a linked list, a table, or any other type of data structure.

Over time, the stored information (and/or in combination with other information) may be utilized to identify when a pod is subject to decommissioning, and how to handle the decommissioning process. For example, as part of the decommissioning process, a volume used by a pod may be automatically analyzed to ascertain how to store the data of the volume for long term retention. Once analyzed, a location and data protection scheme for the data may be identified and implemented to limit resource consumption for retention of the data.

Turning to FIG. 2B, a second data flow diagram illustrating data flows, data processing, and/or other operations that may be performed by the system of FIG. 1 in accordance with an embodiment is shown.

Now consider a scenario, following collection of data access pattern information, in which the orchestrator determines that pod 224 is to be decommissioned. As part of the decommissioning process, as noted above, orchestrator 104 may identify a storage location for the data and a data protection scheme. The location may be, for example, in the same storage in which volume 252 is already stored or may be another storage. When making the selection for the location, storage availability of various storages (e.g., 240, 250, 260) and use of the storages may be taken into account so that the selected location is less likely to limit access to data used by pods that are likely to continue to operate. Once identified, a migration notification may be provided to storage agents that manage the storages.

In FIG. 2B, this request is shown as being constrained to data processing system 202. However, it will be appreciated that any number of migration notifications may be sent to any number of storage agents of any number of data processing systems to facilitate migration of the data from volume 252.

Turning to FIG. 2C, a third data flow diagram illustrating data flows, data processing, and/or other operations that may be performed by the system of FIG. 1 in accordance with an embodiment is shown.

As seen in FIG. 2C, storage 250 may include cache drives 270 and retention drives 280. Cache drives may be higher performance storage devices, while retention drives 280 may be lower performance storage devices. Retention drives 280 may include multiple types of drives of varying performance and cost points.

To identify where to migrate data from volume 252, migration analysis 290 may be performed. During migration analysis 290, the likelihood of new instances of pod 224 being instantiated in the future may be identified. The identification may be made, for example, by analyzing past history of use of the services provided by pod 224.

The likelihood of the new instances of pod 224 may be used to select which of retention drives 280 (or a set of drives) to store the data of volume 252.

Additionally, during migration analysis 290, the benefit and disadvantages of storing the data of volume 252 in accordance with varying data protection schemes may be used to select the type of data protection scheme with which to protect the data of volume 252. For example, the cost for implementing protection schemes with varying levels of protection (e.g., different levels of erasure coding that may afford increase or reduces levels of protection at increased or decreased levels of computing resource utilization) may be balanced against the cost for implementing the varying levels of protection during migration analysis 290. The selected data protection scheme may differ from data protection 272 for volume 252. In FIG. 2C, data protection 272 is drawn with a dashed outline to indicate that depending on implementation, the data used to provide data protection for volume 252 may be intermixed (e.g., party bits) with data of volume 252 or may be separate (e.g., a copy) from the data of volume 252.

Once the location and data protection scheme are identified, a new retention volume 292 (e.g., that implements the data protection scheme and is stored in the identified location) may be instantiated and populated with data from volume 252.

Volume 252 may then be discarded. For example, volume 252 may be deleted, marked for garbage collection, or otherwise removed to free resources of cache drives 270 for other uses.

Any of the services (e.g., 210, 230) described with respect to FIGS. 2A-2C may be implemented using, for example, processes (e.g., executing code within a computing environment), containers that host instances of processes, and/or other architectures for implementing and combining different functionalities to provide a distributed service.

As discussed above, the components of FIG. 1 may perform various methods to provide computer implemented services using pods. FIG. 3 illustrates a method that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for providing computer implemented services in accordance with an embodiment is shown. The method may be performed by components of the system shown in FIG. 1, and/or other components.

At operation 300, a data access pattern for a volume used by an instance of a pod is obtained. The data access pattern may be obtained by (i) identifying that the instance of the pod uses the volume, (ii) associating the volume and the type of the pod with a record, and (iii) adding information regarding use of the volume during a monitoring period to the record. The record may be part of a data structure such as a database. An orchestrator may obtain the data access pattern (e.g., by a requesting it from storage agents).

The data access pattern may be obtained as part of monitoring of data access patterns by any numbers and types of pods deployed across data processing systems. The data base may store records indicating which volumes have been utilized by the different types of pods hosted by the data processing systems over time.

At operation 302, a reclamation policy analysis for the pod is performed based on the data access pattern. The reclamation policy analysis may include comparing criteria from a reclamation policy for the pod to information included in the data access pattern, and/or other information to ascertain whether to decommission the instance of the pod. For example, if the criteria indicates the pod is to be decommissioned when level of use of the instance of the pod falls below a threshold, then the data access pattern may be used to identify the level of the user of the instance of the pod (e.g., inferred based on the data access).

The reclamation policy analysis may be performed, for example, continuously, at discrete points in time (e.g., responsive to occurrences of various events), and/or at different intervals. The reclamation policy analysis may be performed for any number of pods.

At operation 304, a determination is made regarding whether the pod is to be decommissioned. The determination may be made based on a outcome of the reclamation policy analysis. For example, if the criteria of the reclamation policy is met, then the pod may be set for decommissioning.

If the pod is set for decommissioning, then the method may proceed to operation 306 following operation 304. Otherwise, the method may proceed to operation 314.

At operation 306, a migration analysis for the volume is performed to identify a storage location and a data protection scheme for the volume.

The storage location may be identified by (i) identifying a likelihood of new instances of the pod being instantiated in the future, and (ii) selecting the storage location based on the likelihood. For example, different storage locations (e.g., sets of reclamation drives) may be associated with different likelihoods. One of the reclamation drives associated with the identified likelihood may be selected as the storage location.

The storage location may also be selected based on (i) availability of storage space in retention drives of different data processing systems, (ii) historical trends regarding where instances of the pod have been instantiated in the past (e.g., to attempt to select a retention drive of a data processing system where new instances are likely to be instantiated to reduce network communication use), (iii) current input-output (IO) patterns impacting the retention drives (e.g., to attempt to identify drives with currently available write capacity for storing the data), (iv) future IO patterns during periods of time when the data will likely be stored in the retention drives, and/or (v) other considerations.

The data protection scheme may be identified, for example, by evaluating the computational cost (e.g., storage/processing overhead) for implementing and benefit provided by implementing various types of data protection schemes. For example, the volume may be implemented with a high overhead data protection scheme such as duplication (e.g., replication) that consumes large amounts of storage resources but provides an efficient mechanism for addressing potential data loss situation. Other data protection schemes (e.g., erasure coding) may reduce the overhead at the cost of providing a potentially reduced level of data protection. These advantages and disadvantages may be weighed against the cost of data loss with respect to the data of the volume to identify the data protection scheme (e.g., level of erasure coding) to utilize for protecting the data from the volume.

At operation 308, a retention volume is established based on the data protection scheme. The retention volume may be established by reserving a quantity of storage resources sufficient of one or more retention drives at the identified storage location (may be local or remote to the cache drives that store the volume). The retention volume may also be established by, for example, formatting or otherwise placing the reserved storage resources in condition for writing. The storage resources may be reserved by sending requests to storage agents that manage the storage resources.

At operation 310, the retention volume is populated with data from the volume. The retention volume may be populated by storing the data in the retention volume and adding appropriate parity bits or other types of data used to implement the selected data protection scheme for the retention volume.

At operation 312, the volume is discarded. The volume may be discarded by releasing the storage resources of the cache drives that store the volume. The released storage resources may be used for storing other types of data.

At operation 314, computer implemented services are provided using the remaining pods. For example, following operation 304, the pod may be decommissioned if the YES path is followed. Consequently, the pod may not be part of the remaining pods available to provide computer implemented resources. However, if the NO path is followed, then the pod may be part of the remaining pods, and the pod may provide some or all of the computer implemented services.

If the pod is decommissioned, then the retention volume may not be impacted by the services. However, if the pod is still operating, then the data of the volume may be changed as part of the providing the computer implemented services. The method may end following operation 314.

Using the method illustrated in FIG. 3, a system in accordance with an embodiment may be able to dynamically deploy and decommission instances of pods. During the decommissioning, volumes utilized by the pods may be automatically migrated for long term retention in retention drives. Consequently, the limited quantity of high performance storage space of data processing systems hosting the pods may be conserved for use by active instances of pods.

Figure 4:
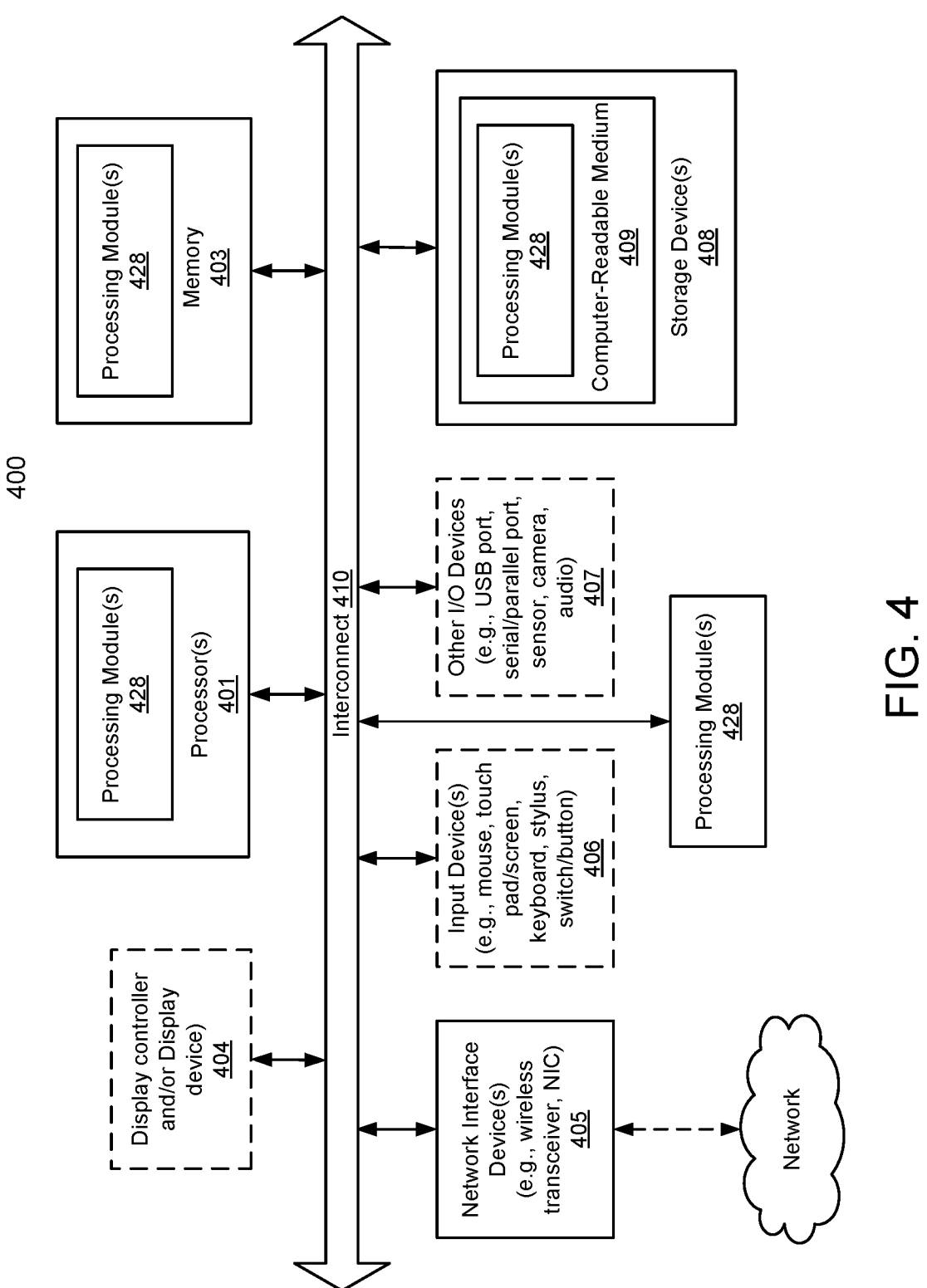
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for providing computer implemented services using pods of containers, the method comprising:

obtaining, by an orchestrator tasked with managing the pods, a data access pattern for a volume used by a current instance of a pod of the pods that provide the computer implemented services;

performing, based on the data access pattern, a reclamation policy analysis for the pod;

in an instance of the reclamation policy analysis where the pod is selected for reclamation:

performing a migration analysis for the volume to identify a storage location and a data protection scheme for the volume, the migration analysis being based at least on whether a new instance of the pod that will replace the current instance and continue to use data from the volume used by the current instance will be instantiated at a future point in time;

establishing a retention volume based on the data protection scheme;

populating the retention volume with the data from the volume;

discarding the volume; and providing the computer implemented services using a portion of the pods that remain in operation.

2. The method of claim 1, wherein the volume is stored, at least in part, in a cache drive and the storage location comprises a retention drive.

3. The method of claim 2, wherein while the volume is protected using a replication scheme while stored in the cache drive.

4. The method of claim 3, wherein the data protection scheme is an erasure coding scheme, and the retention drive is a lower performance drive compared to the cache drive.

5. The method of claim 4, wherein performing the reclamation policy analysis comprises:

identifying a policy comprising criteria for decommissioning of the pod;

monitoring characteristics of the pod;

comparing the characteristics of the pod to the criteria; and selecting the pod for decommissioning in an instance of the comparing where the characteristics of the pod meet the criteria.

6. The method of claim 5, wherein the criteria specify a level of use of the pod.

7. The method of claim 1, wherein performing the migration analysis comprises:

identifying a likelihood of the new instance of the pod being instantiated;

identifying a level of storage resource use for the volume under different data protection schemes; and selecting, based on the likelihood and the level of storage resource use, the storage location and the data protection scheme.

8. A non-transitory machine-readable medium having instructions stored therein, which when executed by a processor, cause the processor to perform operations for providing computer implemented services using pods of containers, the operations comprising:

obtaining, by an orchestrator tasked with managing the pods, a data access pattern for a volume used by a current instance of a pod of the pods that provide the computer implemented services;

performing, based on the data access pattern, a reclamation policy analysis for the pod;

in an instance of the reclamation policy analysis where the pod is selected for reclamation:

performing a migration analysis for the volume to identify a storage location and a data protection scheme for the volume, the migration analysis being based at least on whether a new instance of the pod that will replace the current instance and continue to use data from the volume used by the current instance will be instantiated at a future point in time;

establishing a retention volume based on the data protection scheme;

populating the retention volume with the data from the volume;

discarding the volume; and providing the computer implemented services using a portion of the pods that remain in operation.

9. The non-transitory machine-readable medium of claim 8, wherein the volume is stored, at least in part, in a cache drive and the storage location comprises a retention drive.

10. The non-transitory machine-readable medium of claim 9, wherein while the volume is protected using a replication scheme while stored in the cache drive.

11. The non-transitory machine-readable medium of claim 10, wherein the data protection scheme is an erasure coding scheme, and the retention drive is a lower performance drive compared to the cache drive.

12. The non-transitory machine-readable medium of claim 11, wherein performing the reclamation policy analysis comprises:

identifying a policy comprising criteria for decommissioning of the pod;

monitoring characteristics of the pod;

comparing the characteristics of the pod to the criteria; and selecting the pod for decommissioning in an instance of the comparing where the characteristics of the pod meet the criteria.

13. The non-transitory machine-readable medium of claim 12, wherein the criteria specify a level of use of the pod.

14. The non-transitory machine-readable medium of claim 11, wherein performing the migration analysis comprises:

identifying a likelihood of the new instance of the pod being instantiated;

identifying a level of storage resource use for the volume under different data protection schemes; and selecting, based on the likelihood and the level of storage resource use, the storage location and the data protection scheme.

15. A data processing system, comprising:

a processor; and a memory coupled to the processor to store instructions, which when executed by the processor, cause the processor to perform operations for providing computer implemented services using pods of containers, the operations comprising:

obtaining, by an orchestrator tasked with managing the pods, a data access pattern for a volume used by a current instance of a pod of the pods that provide the computer implemented services;

performing, based on the data access pattern, a reclamation policy analysis for the pod;

in an instance of the reclamation policy analysis where the pod is selected for reclamation:

performing a migration analysis for the volume to identify a storage location and a data protection scheme for the volume, the migration analysis being based at least on whether a new instance of the pod that will replace the current instance and continue to use data from the volume used by the current instance will be instantiated at a future point in time;

establishing a retention volume based on the data protection scheme;

populating the retention volume with the data from the volume;

discarding the volume; and providing the computer implemented services using a portion of the pods that remain in operation.

16. The data processing system of claim 15, wherein the volume is stored, at least in part, in a cache drive and the storage location comprises a retention drive.

17. The data processing system of claim 16, wherein while the volume is protected using a replication scheme while stored in the cache drive.

18. The data processing system of claim 17, wherein the data protection scheme is an erasure coding scheme, and the retention drive is a lower performance drive compared to the cache drive.

19. The data processing system of claim 18, wherein performing the reclamation policy analysis comprises:

identifying a policy comprising criteria for decommissioning of the pod;

monitoring characteristics of the pod;

comparing the characteristics of the pod to the criteria; and selecting the pod for decommissioning in an instance of the comparing where the characteristics of the pod meet the criteria.

20. The data processing system of claim 15, wherein performing the migration analysis comprises:

identifying a likelihood of the new instance of the pod being instantiated;

identifying a level of storage resource use for the volume under different data protection schemes; and selecting, based on the likelihood and the level of storage resource use, the storage location and the data protection scheme.

* * * * *